United States Patent
Callaway, Jr. et al.

(10) Patent No.: US 10,788,883 B2
(45) Date of Patent: *Sep. 29, 2020

(54) TIMER FOR LOW-POWER COMMUNICATIONS SYSTEMS

(71) Applicant: ARM Ltd, Cambridge (GB)

(72) Inventors: Edgar H. Callaway, Jr., Boca Raton, FL (US); Vasan Venkataraman, Fort Lauderdale, FL (US); Brian Alan Nagel, Boynton Beach, FL (US)

(73) Assignee: ARM Ltd, Cambridge (GB)

( * ) Notice: Subject to any disclaimer, the term of this patent is extended or adjusted under 35 U.S.C. 154(b) by 138 days.

This patent is subject to a terminal disclaimer.

(21) Appl. No.: 15/605,976

(22) Filed: May 26, 2017

(65) Prior Publication Data

US 2018/0341311 A1    Nov. 29, 2018

(51) Int. Cl.
*G06F 1/324* (2019.01)
*H04W 52/02* (2009.01)
*G06F 1/3287* (2019.01)
*G06F 1/3296* (2019.01)

(52) U.S. Cl.
CPC ............ *G06F 1/324* (2013.01); *G06F 1/3287* (2013.01); *G06F 1/3296* (2013.01); *H04W 52/0293* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 5,815,819 A | * | 9/1998 | Ohta | H04W 52/029 455/574 |
| 5,845,204 A | * | 12/1998 | Chapman | H04W 52/029 455/343.1 |
| 5,995,820 A | | 11/1999 | Young et al. | |
| 6,735,454 B1 | | 5/2004 | Yu et al. | |
| 2004/0063473 A1 | * | 4/2004 | Devries | G06F 1/14 455/572 |
| 2006/0149984 A1 | * | 7/2006 | Yasumoto | G01S 19/23 713/322 |
| 2016/0147503 A1 | * | 5/2016 | Burgess | G06F 7/5375 708/650 |
| 2017/0371661 A1 | * | 12/2017 | Sparling | G06F 1/28 |
| 2018/0316355 A1 | * | 11/2018 | Yamamoto | H03L 3/00 |

FOREIGN PATENT DOCUMENTS

GB     2 329 795     3/1999

* cited by examiner

*Primary Examiner* — Kim Huynh
*Assistant Examiner* — Kevin M Stewart
(74) *Attorney, Agent, or Firm* — Leveque IP Law, P.C.

(57) ABSTRACT

A communications system and method provides power-saving while maintaining required protocol timing resolution. In a communication system that requires a high-frequency, high-precision, but high-power, clock source to meet timing requirements, selective disablement and re-enablement of the high-frequency clock provides for both timing precision and power reduction in the system.

25 Claims, 5 Drawing Sheets

TIMER FOR LOW-POWER COMMUNICATIONS SYSTEMS

BACKGROUND

In many communications systems, including low-power systems, there is a need to manage power consumption of components of the system. This may be especially true of communications systems that operate in accordance with low-power wireless protocols such as Bluetooth and IEEE 802.15.4. Such systems may use high-frequency, high-power clock sources to provide needed timing precision. While precise, high-frequency clock sources are not advantageous from a system power budget standpoint. There is accordingly a need to minimize power consumption in a communication system that employs high-frequency, high-power clock sources without sacrificing required timing resolution provided by these clock sources.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In low-power communications systems there is a need to conserve not only power expended but also to maintain the timing resolution and precision that is provided by high-frequency, high-power clocks employed within the system. The various embodiments presented herein may be applicable to any communication system or application in which a certain level of timing resolution in combination with power conservation is desirable. The embodiments presented herein may be especially advantageous for low-power, low-voltage communication systems, such as Low-Power Wide-Area Networks (LPWANs) and Wireless Personal Area Networks (WPANs), that operate in accordance with various wireless protocols, such as the Narrow-Band IoT (NB-IoT), Bluetooth, Bluetooth 5 and IEEE 802.15.4 low-power wireless protocols. Such systems are concerned with conserving power but not at the expense of required timing precision. In addition to WPAN radios based on the Bluetooth 5 and IEEE 802.15.4 standard, other environments in which power savings in combination with good timing resolution is advantageous may include LPWAN applications based on the NB-IoT standard for Internet of Things (IoT) technologies. For example, the embodiments presented herein are useful for LPWAN applications based on the NarrowBand IoT (NB-IoT) low power, wide area radio connectivity standard, including the 3GPP NB-IoT standard. The embodiments are further useful for RF-to-Applicant coverage for WPAN radios based on the Bluetooth 5 and 802.15.4 standard, including on-chip radio connectivity for system-on-chips (SoCs) and system-on-modules (SoMs) that implement WPAN wireless solutions for IoT.

Accordingly, the embodiments presented herein describe a power-saving approach while maintaining precise wireless protocol timing in communications systems. In a communication system that requires a high-frequency, high-precision, but high-power, clock source or oscillator to meet timing requirements, selective disablement and enablement of the high-frequency clock while a low-frequency, low-power clock continues to operate provides for both timing precision and power reduction in the system.

While selective disablement of the high-frequency clock source between periods of system activity, such as between scheduled reception or transmission periods of a radio, is beneficial for overall system power consumption reduction, the low-frequency clock source that remains running is itself unable to provide sufficient timing resolution necessary to ensure that a future scheduled protocol operation, i.e. transmission or reception of data, will be performed at the precise time required by the communications protocol.

This difficulty is addressed by taking advantage of the known frequency relationship between the high- and low-frequency clock sources. Counters, one associated with the high-frequency clock source and the other associated with the low-frequency clock source, are employed. Hardware as well as software-based counters may be used, though the use of hardware counters provides the advantage of being less computationally demanding. Further, while two counters are shown and described for the low-frequency counter and the high-frequency counter functionalities, these functions may each be provided by any number of counters and counter arrangements. The low-frequency counter is always powered and enabled and counting the low-frequency clock source, which also remains powered even when the high-frequency clock source is selectively disabled. A counter value associated with a high-frequency, high-power clock source may be adjusted by an offset value to account for time during which the high-frequency clock is selectively disabled. Selective disablement of the high-frequency clock source for periods of time and subsequent compensation of the timer counter value to take into account the selective disablement of the high-frequency clock source provides a power-savings while maintaining timing sufficient to comply with various communications standards. As used herein, the term counter, timer and timer counter may be used interchangeably. The counters may count upwards or downwards, and may be comprised of various random logic, such as flip-flops.

Figure 1:
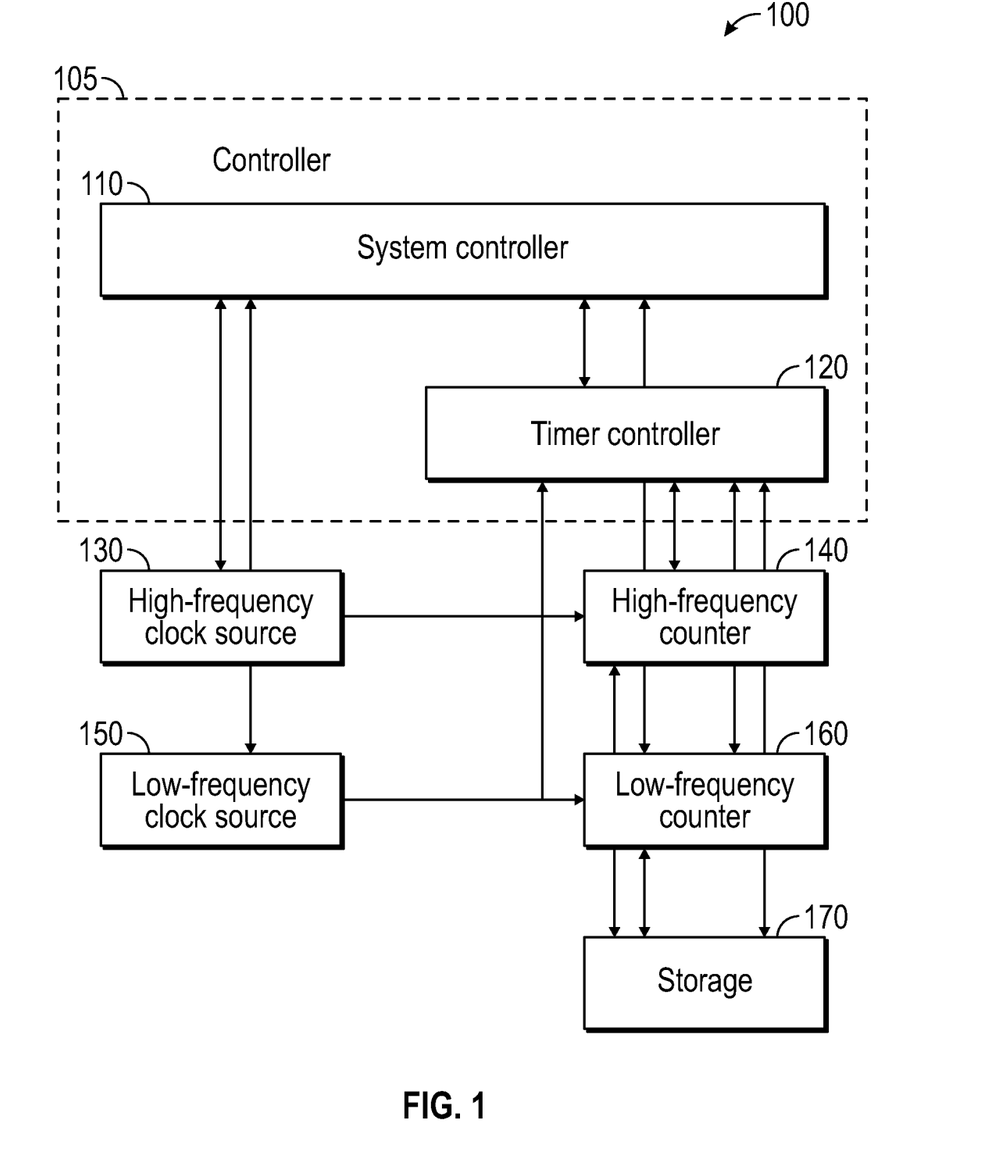
FIG. 1 illustrates a block diagram of a communications system, in accordance with various representative embodiments.

Referring now to the communications system diagram 100 of FIG. 1, the system architecture includes controller 105, which may include a system controller 110 and a timer controller 120 as shown, high-frequency clock source 130, low-frequency clock source 150, high-frequency counter 140, low-frequency counter 160, and storage 170. While high-frequency clock source 130 is shown as a separate functional block from low-frequency clock source 150, it is envisioned that high-frequency clock source 130 may be synthesized or derived from low-frequency clock source 150 in certain embodiments. For example, high-frequency clock source 130 may be synthesized from low-frequency clock source 150 using a phase-locked loop (PLL). There optionally may be a frequency divider between high-frequency clock source 130 and high-frequency counter 140, and in communication with timer controller 120.

In accordance with certain example embodiments, controller 105 may be a state machine that encompasses the functionality of both the system controller 110 and the timer controller 120. The terms controller, system controller, and timer controller as used herein may encompass or make use of programmable hardware such as: computers, microcontrollers, embedded microcontrollers, microprocessors, application-specific integrated circuits (ASICs), field-programmable gate arrays (FPGAs), and complex programmable logic devices (CPLDs). These hardware examples may further be used in combination to achieve a desired functional controller module. Computers, microcontrollers and microprocessors may be programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device.

Timer controller 120 and clock sources 130 and 150 are coupled to and controlled by system controller 110. Counters 140 and 160, as well as storage 170, are in communication with and controlled by timer controller 120 as shown. The high-frequency counter 140 coupled to the high-frequency clock source 130 is operable to count at the clock frequency of the high-frequency clock source, or a derivative thereof. Similarly, low-frequency counter 160 coupled to the low-frequency clock source 150 counts at the clock frequency of the low-frequency clock source, or a derivative thereof. As used herein, the terms clock, clock source, oscillator and crystal may be used interchangeably.

High-frequency clock source 130 is needed to maintain precise system timing required by a communications protocol, but when operational consumes more power than the low-frequency clock source 150. There is accordingly an incentive to minimize operation of the high-frequency clock source to lessen power consumption but to do so in a manner that does not sacrifice timing precision beyond an acceptable level.

As will be explained, at a first time, the system controller 110 can disable operation of the high-frequency clock source even while the low-frequency clock source continues to run. At this time, the high-frequency counter 140 can no longer count the high-frequency clock 130, though low-frequency counter 160 continues to count low-frequency clock 150. Then, at a second time after the first time, the system controller 110 re-enables operation of the high-frequency clock source 130 and at a third time subsequent the second time the system controller 110 re-enables the high-frequency counter 140 to resume counting at a new high-frequency counter value. The second time may be defined by a counter value of the low-frequency counter 160 reaching a predetermined value. The system controller 110 upon receiving a trigger from the low-frequency counter 160 may take steps to re-enable the high-frequency counter as will be described.

Upon system start-up prior to the first time and responsive to the timer controller 120 detecting the occurrence of a transition type of the low-frequency clock source 150, the timer controller 120 may enable both the high-frequency counter 140 of the high-frequency clock source 130 and the low-frequency counter 160 of the low-frequency clock source 150 to begin counting. The transition type of the second clock source can be either a rising edge or a falling edge of the second clock source.

The new high-frequency counter value is determined and may be calculated by the timer controller 120, which also controls when the high-frequency counter 140 resumes counting. Calculation of the new high-frequency counter value by timer controller 120 takes into account the time that the high-frequency clock source 130 was disabled, so that the new high-frequency clock source counter value is substantially the same as what would have been counted by high-frequency counter 140 if high-frequency clock source 130 had not been disabled. The new high-frequency counter value may thus be determined by the timer controller 120 based on a duration of time that the high-frequency clock source 130 was disabled and a previous high-frequency counter value of the high-frequency counter 140 at the first time. The timer controller 120 may accordingly determine the new high-frequency counter value by adjusting a retrieved counter value of the high-frequency counter 140 that was stored in storage 170 so that the time during which the high-frequency clock source was disabled is taken into account. In accordance with various embodiments, the high-frequency count and the low-frequency count may be stored in storage 170, which may be internal and/or external memory, including, for example: non-volatile memory (NVM), retention memory, retention flip-flops, and other suitable storage means. Storage 170 may also be volatile storage, such as random access memory (RAM) or a flip-flop array, implemented in an always-on power domain.

There are various ways that the new high-frequency counter value can be determined. In instances where the counter value of the high-frequency and low-frequency counters 140, 160 are stored in storage 170 at a given transition type of the low-frequency clock source 150, such as the rising edge or the falling edge, for example, the retrieved counter value of high-frequency counter 140 may be the last stored counter value of the high-frequency clock source before the high-frequency clock source was disabled. The timer controller 120 may determine the new high-frequency counter value from a last counter value of the high-frequency counter 140, a last stored counter value of the low-frequency counter 160, and a current counter value of the low-frequency counter 160. The last stored counter values of the low- and high-frequency counters 140, 160 may be retrieved from a storage element of the system, such as storage 170. Further, timer controller 120 may determine the new high-frequency counter value from a remainder value based upon a previous resumption of the high-frequency counter. Moreover, the new high-frequency counter value may be determined by timer controller 120 from a last stored counter value of the high-frequency counter and a high-frequency counter offset value. In this case, timer controller 120 may determine the high-frequency counter offset value at a defined transition of the low-frequency clock source by multiplying a difference between the low-frequency counter value at the defined transition and a last stored counter value of the low-frequency counter by a ratio of the clock frequency of the high-frequency clock source to the clock frequency of the low-frequency clock source.

The timer controller 120 can communicate the new high-frequency counter value to the system controller 110. As will be shown, the high-frequency counter may be re-enabled at the new high-frequency clock source counter value subsequent to re-enabling operation of the high-frequency clock source itself.

In accordance with various embodiments, prior to the system controller re-enabling the high-frequency counter 140 to resume counting at the new high-frequency counter value at the third time, the timer controller 120 can initialize the high-frequency counter with the new high-frequency counter value. Responsive to the system controller re-enabling operation of the high-frequency clock source at the second time, the high-frequency clock source may warm up during a warm-up period and become active during an active period that is subsequent the warm-up period. Further, the high-frequency counter may be initialized with the new high-frequency counter value during the warm-up period of the high-frequency clock source, and/or a portion of the active period of the high-frequency clock source that occurs prior to the third time. Alternately, in accordance with certain embodiments, timer controller 120 may be operable to generate the new high-frequency counter value after the second time and to then initialize the high-frequency counter 140 with the new high-frequency counter value before the third time.

The system controller 110 can selectively disable the high-frequency clock source between periods of activity of the system when the high-frequency clock is not required. Controlling when the system controller 110 disables operation of high-frequency clock source 130 can allow for significant power savings while maintaining an acceptable level of system performance with respect to the communications protocol being employed by the system. Periods of activity of the system may be scheduled data reception and/or scheduled data transmission by the system. When the system has one or more functional blocks, the functional blocks of the system can be operable to perform one or more scheduled operations based upon the new high-frequency counter value of the high-frequency clock source and under control of the system controller. The functional blocks may be a receiver and/or a transmitter of a radio, pager, global positioning system (GPS) device, or a sensor for various types of measurements, including moisture, wind, pressure, and voltage measurements.

In the case where the system is a multiple power-domain system, further system power savings may be realized by powering down one or more subsystems of the system between periods of activity of the system. The periods of activity of the system may include periods of warm-up, warm-down, data reception, data transmission, and/or data processing by the system. For example, part of the warm-up period of a radio system may include programming a synthesizer with an operating frequency. Processing data may include processing either received data or data to be transmitted. An audio codec can be provided with signal processing data before transmission. Action may be taken in response to receiving data, such as writing a message, decrypting or authenticating the received information, or simply sending it on.

Figure 2:
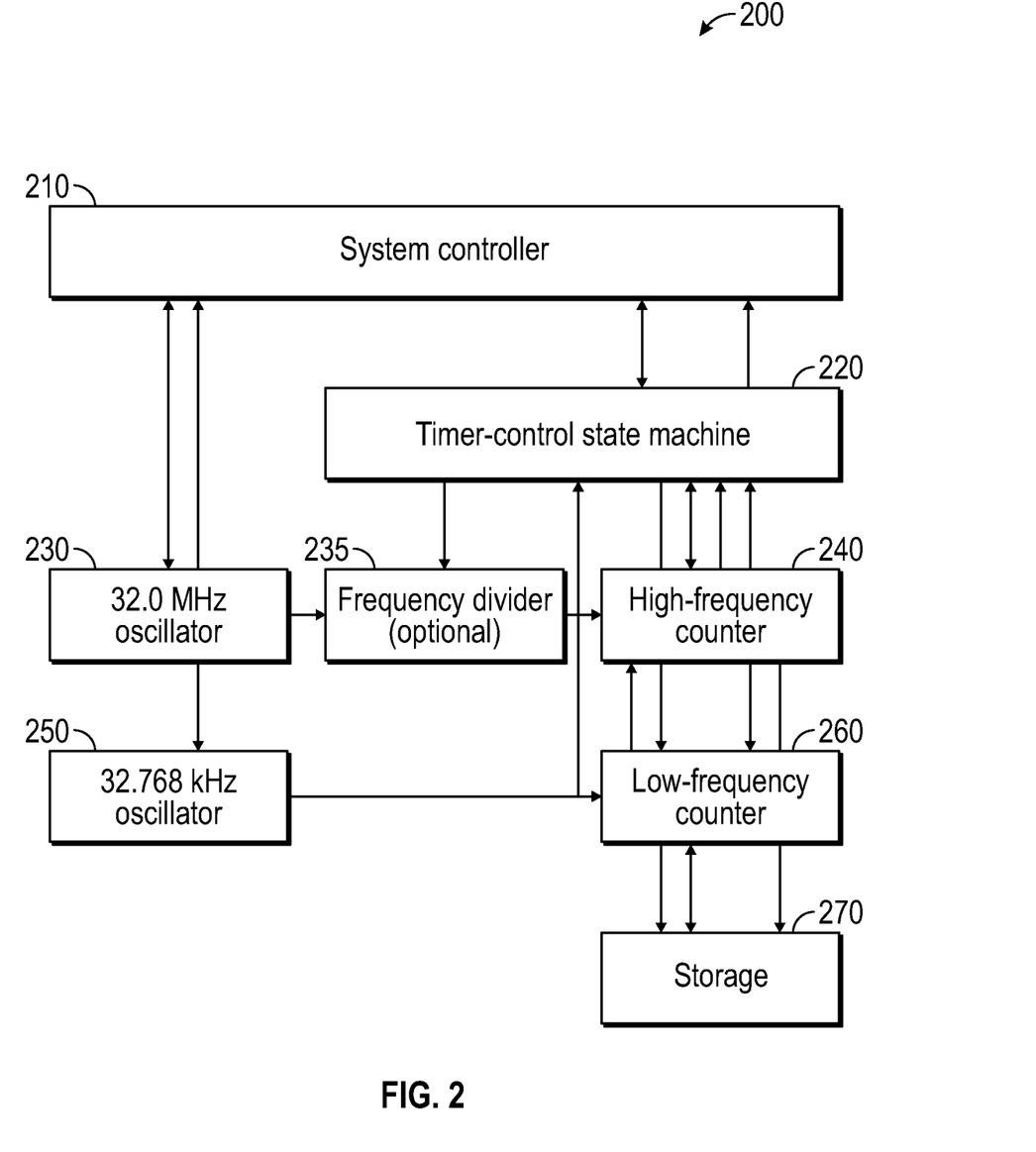
FIG. 2 illustrates a block diagram of a low-power wireless communications system, in accordance with various representative embodiments.

Referring now to a specific example of a low-power wireless communications system, such as one that operates in accordance with a Bluetooth and IEEE 802.15.4 low-power wireless protocol, FIG. 2 illustrates a system having a system controller 210, timer-control state machine 220, high-frequency clock source 230, low-frequency clock source 250, optional frequency divider 235, high-frequency counter 240, low-frequency counter 260, and storage 270. Timer-control state machine 220 and clock sources 230 and 250 are coupled to and controlled by system controller 210. Counters 240 and 260, as well as frequency divider 235 and storage 270, are in communication with and controlled by timer-control state machine 220 as shown. The timer controller in system 200 is provided by a timer-control state machine 220 in cooperative communication with and under the control of system controller 210, as shown. The high-frequency counter 240 coupled to the high-frequency clock source 230 is operable to count at the clock frequency of the high-frequency clock source, or a derivative thereof. Similarly, low-frequency counter 260 coupled to the low-frequency clock source 250 counts at the clock frequency of the low-frequency clock source, or a derivative thereof.

The clock frequencies of the high- and low-frequency clock sources 230, 250 may correspond to the requirements of a particular wireless protocol. In this example, the high-frequency clock source 230 may be a 32 MHz oscillator as shown; 16 MHz and 24 MHz oscillators may also be used. High-frequency counter 240 may be a 32-bit binary incrementing counter. Low-frequency clock source 250 is illustrated as a 32.768 kHz oscillator; low-frequency counter 260 may be a 32-bit binary incrementing counter. It is contemplated that counters of other lengths may be used within the system architecture 200.

Prior to disabling high-frequency clock source 230, count value $Y_0$ of high-frequency counter 240 is stored for later retrieval. This implementation ensures that the halt-and-store operation occurs at a specific transition of the low-frequency clock source 250. The count value $X_0$ of the low-frequency counter 260 is also stored; low-frequency counter 260 continues its count. A wake-up trigger may be programmed based on a future value of the low-frequency counter 260 and the high-frequency clock source 230 disabled, thereby allowing the system to enter a low-power condition.

When the wake-up trigger occurs, the high-frequency clock source 230 is re-enabled, but the high-speed counter may not be immediately enabled. It is enabled at a specific transition of the low-frequency counter 260. The difference between the low-frequency count value at this transition of the low-frequency counter and that stored prior to the low-power state may be multiplied by the ratio of the high-frequency clock source to the low-frequency clock source. This result may then be added to the previously stored high-frequency count value $Y_0$ to yield a new high-frequency counter value $Y_1$ and re-loaded into the high-frequency counter 240. The high-frequency counter 240 can then resume counting from the reloaded new high-frequency counter value. This results in the high-frequency counter 240 appearing almost as if it had been counting throughout the period of reduced power consumption, when the high-frequency clock source 230 was disabled. Scheduled system operations, such as transmission or reception, for example, may occur based upon a value of the high-frequency count, thereby ensuring the necessary timing resolution required by the communications protocol.

While a software solution may also be employed, based upon the low-frequency clock, it is computationally much more intensive. This may be of concern for systems that employ a low-power microcontroller, which may find it taxing to convert a specific number of microseconds to a number of 32.768 kHz clock periods, plus an offset. Additionally, a low-frequency time-base, such as 32.768 kHz used in some wireless protocol timing applications, is not as precise as a higher-frequency clock source. As a result of using a low-frequency time-base, it may be necessary to turn on a receiver early, for example, in order to avoid missing a message. This, of course, consumes extra power.

By way of example and not limitation, in a particular implementation the rising edge of the 32.768 kHz low-frequency clock 250 is used to trigger all events; however, the falling edge or other consistently timed events could instead be used. Upon system start-up, timer-control state machine 220 detects this edge of low-frequency clock 250 and enables both counters 240, 260 to start counting. While the high-frequency clock 230 remains enabled, the low-frequency count $X_0$ and the high-frequency count $Y_0$ are stored at each rising edge of the low-frequency counter 260 in this particular example. It is understood, however, that counts $X_0$ and $Y_0$ need not be stored at each transition of a given transition type (e.g., at each rising edge) of low-frequency counter 260, so long as storage is performed at one or more transitions of a selected transition type of the low-frequency counter 260. Only the most recent value of each counter must be retained; earlier values may be overwritten if desired. Storage 270 may be analogous in form and function to storage 170, described above.

When the primary system controller 210 determines that the high-frequency oscillator 230 may be disabled, it may do so immediately, without notifying the timer-control state machine 220; the necessary information would have already been stored on the previous rising edge of the 32.768 kHz clock 250. At a previously programmed counter value of the low-frequency counter 260, the system controller 210 restores power to any system domains that might have been unpowered during inactivity, and re-enables the high-frequency oscillator 230.

Upon the next rising edge of the 32.768 kHz low-frequency oscillator 250 after resumption of the high-frequency oscillator 230, the timer-control state machine 220 performs the following functions:

Retrieves the previously stored low-frequency counter value, $X_0$

Retrieves the previously stored high-frequency counter value, $Y_0$

Retrieves the remainder value, if any, that was stored from the previous calculation, $Y_{rv0}$, associated with a previous resumption of the high-frequency counter Observes the current counter value of the low-frequency count, $X_1$ Computes the new high-frequency counter value, $Y_1$, as follows:

$$Y_1 = f_1(Y_0, X_1, X_0, Y_{rv0})$$

Stores any new remainder value $Y_{rv1}$ obtained from computing the new high-frequency counter value, as follows:

$$Y_{rv1} = f_2(X_1, X_0, Y_{rv0})$$

In an example consistent with certain embodiments, the divided-down frequency is 1.0 MHz. The computation of the new high-frequency counter value uses the ratio between the frequencies at which the high-frequency and low-frequency counters are being clocked, which in this example is 1000000/32768 and can be reduced to 15625/512. A division by 512 can be implemented as a bit-wise operation, i.e., shift-right 9 bits. The computation of the new high-frequency counter value results in some loss of precision or timing resolution because of the division by 512 (or shift-right by 9 bits) that would accrue detrimentally over multiple store-and-retrieve cycles. To address this, the remainder of the division is preserved as the remainder value ($Y_{rv}$), which can be calculated by means of a division modulo 512. Division modulo 512, in turn, can be implemented as a bit-wise operation by preserving only the lowest 9 bits of the operand.

Consequently $f_1(\ )$ and $f_2(\ )$ are defined in this example embodiment as follows:

$$f_1(Y_0, X_1, X_0, Y_{rv0}) = ((Y_0 <\!\!<9) + 15625*(X_1-X_0) + Y_{rv0}) >\!\!>9$$

$$f_2(X_1, X_0, Y_{rv0}) = (15625*(X_1-X_0) + Y_{rv0}) \& 0x1FF$$

The new high-frequency counter value, $Y_1$, is loaded into the high-frequency counter 240, which is then enabled to resume counting at the new high-frequency counter value. Resumption of counting by the high-frequency counter 240 at this value results in the high-frequency counter 240 appearing almost as if it had been counting throughout the period of low power. Scheduled protocol operations (e.g., reception or transmission) may then occur based on a value of the high-frequency counter.

Figure 3:
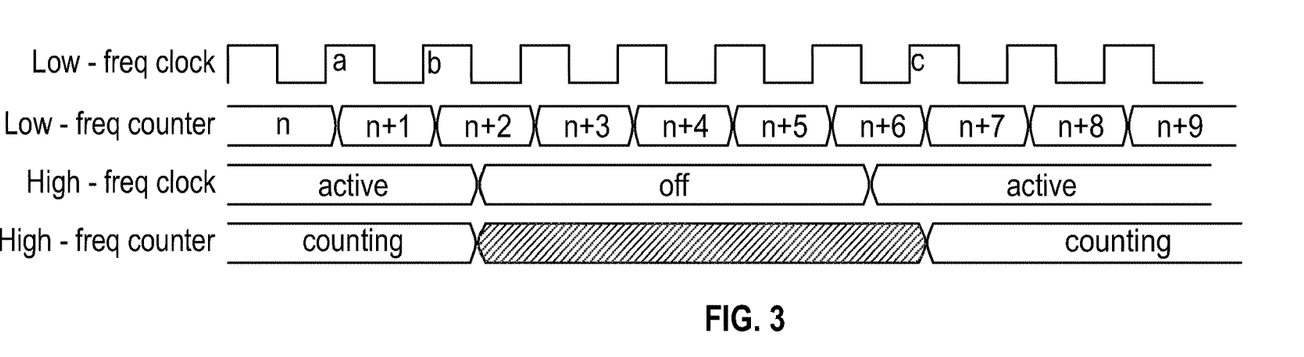
FIGS. 3 and 4 are timing diagrams that illustrate selective disablement and re-enablement of a high-frequency clock source of a communications system, in accordance with various representative embodiments.

In the example illustrated in the timing diagram of FIG. 3, while the high-frequency clock is enabled, the values of the low-frequency counter and the high-frequency counter are saved at every rising edge of the low-frequency clock (at times "a" and "b"). While the high-frequency clock is selectively disabled, no writes to the storage element are performed. Upon a rising edge of the low-frequency clock after the high-frequency clock is re-enabled (at time "c"), the computation of the new high-frequency counter value is performed by the timer-control state machine, the high-frequency counter is loaded with the computed counter value, i.e. the new high-frequency counter value, and the high-frequency counter is enabled to resume counting from the new high-frequency counter value.

Figure 4:
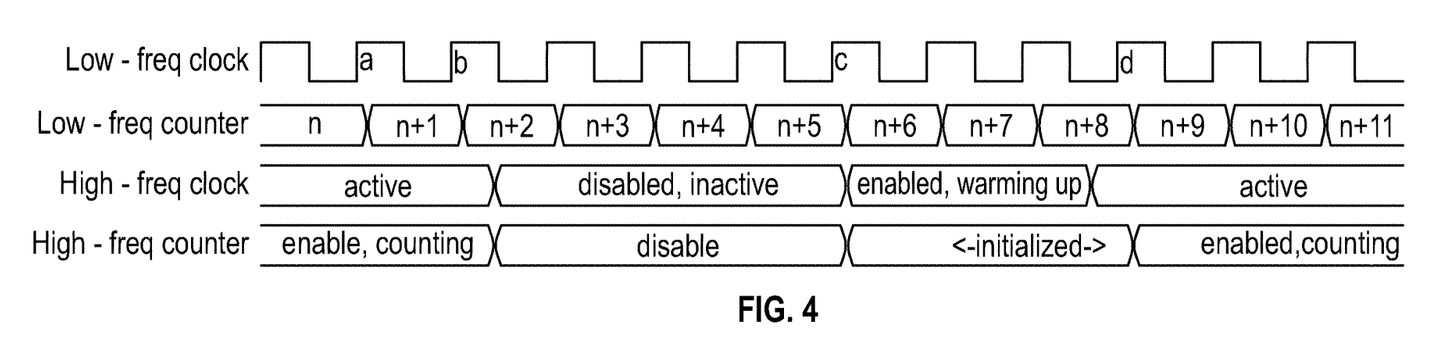

Referring now to the timing diagram of FIG. 4, the high-frequency clock source is re-enabled (at time "c"), a wake-up trigger point based on the value of the low-frequency counter. It is envisioned that the high-frequency clock source may require a warm-up time before it becomes active, and that this warm-up time may vary as a result of various factors. The high-frequency counter is enabled to resume counting at time "d", an edge of the low-frequency clock that occurs after the high-frequency clock source is re-enabled and active. Prior to enabling the high-frequency counter, it is initialized with the computed new high-frequency counter value, so that when enabled the high-frequency counter will begin counting from the computed new high-frequency counter value. The high-frequency counter may be initialized at any time up to time "d", as long as allowances are made for any uncertainty in the warm-up time of the high-frequency clock source.

While a software solution exists that is based on the 32.768 kHz clock, it is computationally intensive for a low-power microcontroller to convert a specific number of microseconds to a number of 32.768 kHz clock periods, plus an offset. A system that includes a timer that is clocked at an integer number of mega-Hertz is more easily converted to microseconds. Additionally, a low-frequency time-base, such as 32.768 kHz introduces a larger uncertainty in wireless protocol timing, which must be allowed for by turning on a receiver earlier to avoid missing a message, thereby consuming extra power.

In view of the foregoing description, it can be readily understood that in accordance with certain representative embodiments of the present disclosure, there is provided a system having a system controller; a timer controller coupled to and controlled by the system controller; a first clock source coupled to and controlled by the system controller, the first clock source having a first clock frequency; a first counter coupled to the first clock source, coupled to and controlled by the timer controller, and operable to count at the first clock frequency or a derivative of the first clock frequency; a second clock source coupled to and controlled by the system controller, the second clock source having a second clock frequency less than the first clock frequency of the first clock source; and a second counter coupled to the second clock source, coupled to and controlled by the timer controller, and operable to count at the second clock frequency or a derivative of the second clock frequency, the second clock source and the second counter enabled during operation of the system. The system controller disables operation of the first clock source at a first time. At a second time subsequent the first time, the system controller re-enables operation of the first clock source and at a third time subsequent the second time the system controller re-enables the first counter to resume counting at a new first frequency counter value based on a duration of time that the first clock source was disabled and a previous first counter value of the first counter at the first time, the new first frequency counter value determined by the timer controller.

Figure 5:
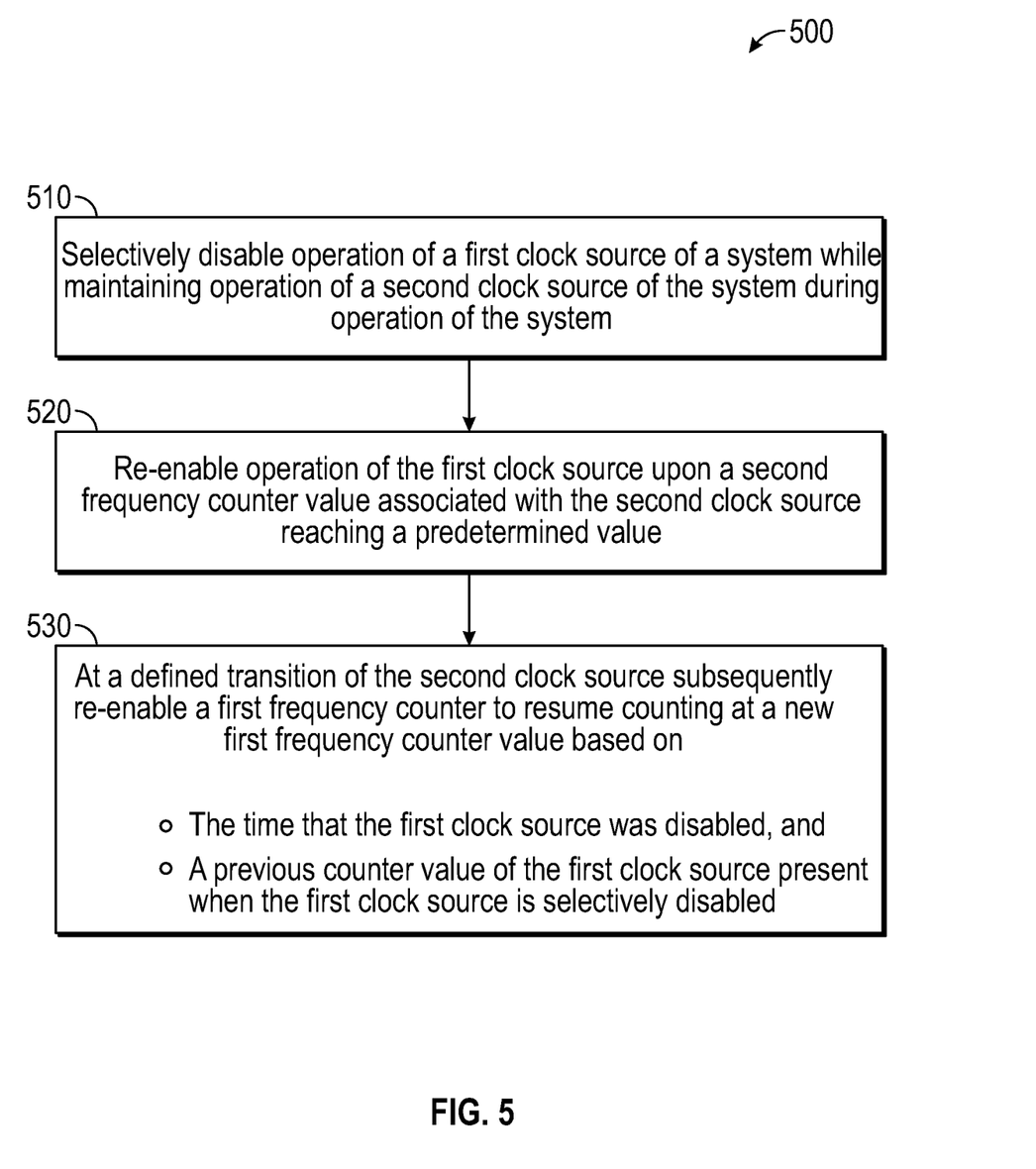
FIGS. 5 and 6 are flowcharts that illustrate selective disablement and re-enablement of a block diagram of a high-frequency clock source of a communications system, in accordance with various representative embodiments.

The above description further describes methods for lowering power usage by a communications system while still allowing the system to perform in conformance with protocol timing requirements. Referring to flow chart 500 of FIG. 5, at block 510 operation of a first clock source of a system is selectively disabled while operation of a second clock source of the system is maintained during operation of the system. In the terminology used herein the first clock source is the high-frequency clock source while the second clock source corresponds to the low-frequency clock source, in which the first clock frequency is higher than the second clock frequency. At block 520, operation of the first clock source is re-enabled upon a second frequency counter value associated with the second clock source reaching a predetermined value. At block 530, at a defined transition of the second clock source a first frequency counter is subsequently re-enabled to resume counting at a new first frequency counter value. This new first frequency counter value may be based on a duration of time that the first clock source was disabled and a previous first frequency counter value of the first clock source present when the first clock source is selectively disabled.

Figure 6:
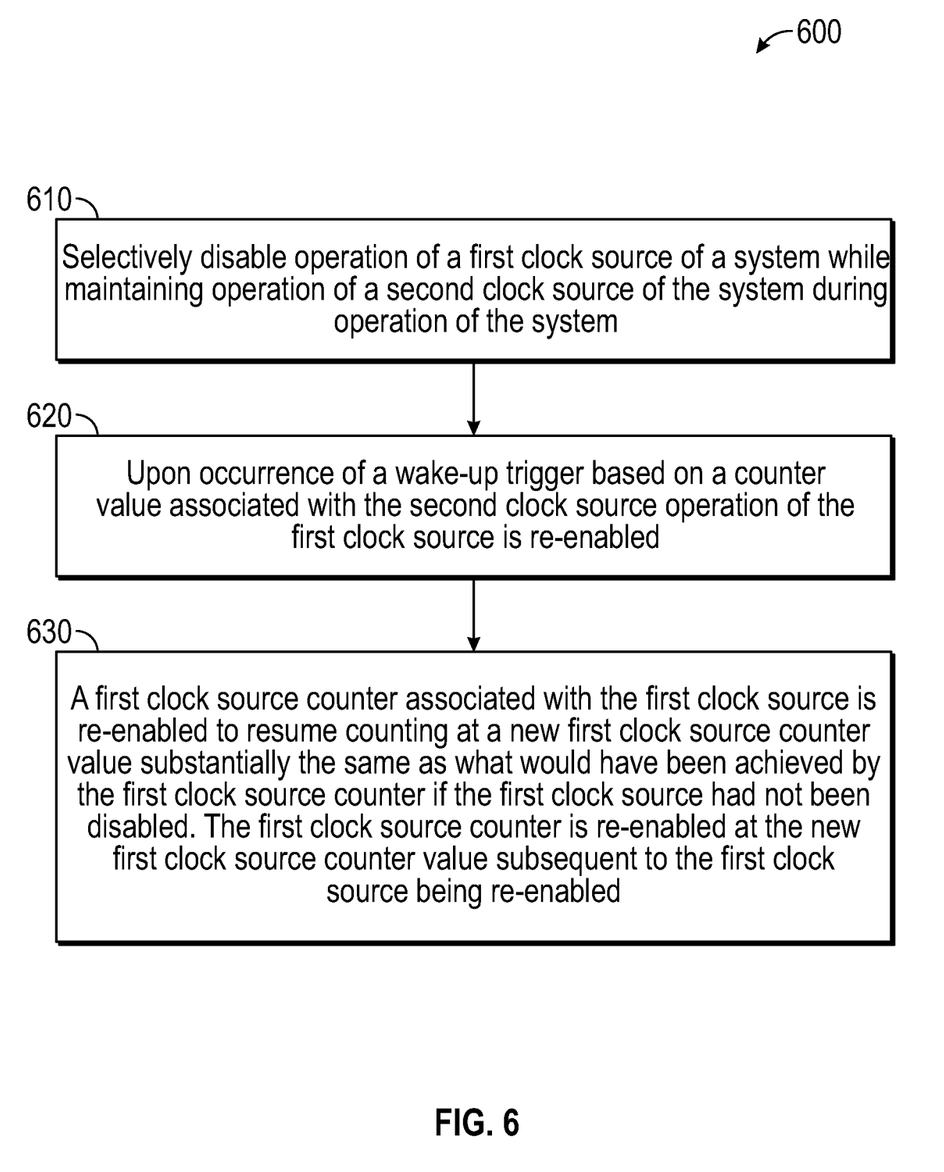

In flowchart 600 of FIG. 6, at block 610 operation of a first clock source of a system is selectively disabled while maintaining operation of a second clock source of the system during operation of the system. The first clock source has a first clock frequency and the second clock source has a second clock frequency. At block 620, upon occurrence of a wake-up trigger based on a counter value associated with the second clock source, operation of the first clock source is re-enabled. At block 630, a first clock source counter associated with the first clock source is re-enabled to resume counting at a new first clock source counter value substantially the same as would have been achieved by the first clock source counter if the first clock source had not been disabled. The first clock source counter is re-enabled at the new first clock source counter value subsequent to the first clock source being re-enabled.

It can be seen that the system and methodologies presented herein provide a low-power way of maintaining precise timing sufficient to comply with various communications standards, including Bluetooth, IEEE 802.15.4, and future IoT standards. The low-power goal is achieving by allowing the system to selectively disable its high-speed clock source (oscillator) between communication events, while still meeting the required timing of those events. Moreover, this approach may be achieved by simple hardware, thus avoiding the use of computationally intensive software that expends power and time.

Accordingly, some aspects and features of the disclosed embodiments are set out in the following numbered items:

1. A system, comprising: a system controller; a timer controller coupled to and controlled by the system controller; a first clock source coupled to and controlled by the system controller, the first clock source having a first clock frequency; a first counter coupled to the first clock source, coupled to and controlled by the timer controller, and operable to count at the first clock frequency or a derivative of the first clock frequency; a second clock source coupled to and controlled by the system controller, the second clock source having a second clock frequency less than the first clock frequency of the first clock source; and a second counter coupled to the second clock source, coupled to and controlled by the timer controller, and operable to count at the second clock frequency or a derivative of the second clock frequency, the second clock source and the second counter enabled during operation of the system; where the system controller disables operation of the first clock source at a first time; and where at a second time subsequent the first time the system controller re-enables operation of the first clock source and at a third time subsequent the second time the system controller re-enables the first counter to resume counting at a new first frequency counter value based on a duration of time that the first clock source was disabled and a previous first counter value of the first counter at the first time, the new first frequency counter value determined by the timer controller.
2. The system of item 1, where the timer controller communicates the determined new first frequency counter value to the system controller.
3. The system of item 1, where prior to the system controller re-enabling at the third time the first counter to resume counting at a new first frequency counter value, the timer controller initializes the first counter with the new first frequency counter value.
4. The system of item 3, where responsive to the system controller re-enabling operation of the first clock source at the second time, the first clock source warms up during a warm-up period and becomes active during an active period that is subsequent the warm-up period.
5. The system of item 4, where the first counter is initialized with the new first frequency counter value during one or more of the warm-up period of the first clock source and a portion of the active period of the first clock source that occurs prior to the third time.
6. The system of item 1, where the timer controller is operable to generate the new first frequency counter value after the second time and to then initialize the first counter with the new first frequency counter value before the third time.
7. The system of item 1, the second clock source characterized as consuming less power when operational than the first clock source.
8. The system of item 1, where the system controller disables the first clock source between periods of activity of the system when the first clock source is not required.
9. The system of item 1, where the second time is defined by a counter value of the second counter reaching a predetermined value.
10. The system of item 1, where the timer controller is operable to generate the new first frequency counter value by adjusting a retrieved first timer counter value to correct for the time during which the first clock source was disabled.
11. The system of item 10, where the retrieved first timer counter value is the previous counter value of the first counter at the first time and was retrieved from a storage element of the system.
12. The system of item 1, where the timer controller determines the new first frequency counter value from a last counter value of the first counter, a last counter value of the second counter, and a current counter value of the second counter.
13. The system of item 12, where the last counter values of the first and second counters are retrieved from a storage element of the system.
14. The system of item 12, where the timer controller further determines the new first frequency counter value from a remainder value based upon a previous resumption of the first counter.
15. The system of item 1, where the new first frequency counter value is determined by the timer controller from a last stored counter value of the first counter and a first frequency counter offset value.
16. The system of item 15, where the timer controller determines the first frequency counter offset value at a defined transition of the second clock source by multiplying a difference between a second frequency counter value at the defined transition and a last stored counter value of the second counter by a ratio of the first clock frequency to the second clock frequency.
17. The system of item 1, further comprising one or more functional blocks and the one or more functional blocks operable to perform one or more scheduled operations based upon the new first frequency counter value of the first clock source and under control of the system controller.
18. The system of item 17, where the one or more functional blocks comprises one or more of a receiver and a transmitter.
19. The system of item 1, further comprising storage in which the first frequency count and the second frequency count are stored.
20. The system of item 19, where the storage comprises one or more of non-volatile memory and volatile storage implemented in an always-on power domain.
21. The system of item 1, where the system is a multiple power-domain system and further power savings of the system are realized by powering down one or more subsystems of the system between periods of activity of the system.
22. The system of item 21, where the periods of activity of the system comprise one or more of periods of warm-up, warm-down, data reception, data transmission, and data processing by the system.
23. The system of item 22 where the periods of activity are one or more of scheduled data reception and scheduled data transmission by the system.
24. The system of item 1, where upon system start-up prior to the first time and responsive to the timer controller detecting the occurrence of a transition type of the second clock source, the timer controller enables both the first counter of the first clock source and the second counter of the second clock source to begin counting.
25. The system of item 24, where the transition type of the second clock source is either a rising edge or a falling edge of the second clock source.
26. A method, comprising: selectively disabling operation of a first clock source of a system while maintaining operation of a second clock source of the system during operation of the system, the first clock source having a first clock frequency and the second clock source having a second clock frequency; and re-enabling operation of the first clock source upon a second frequency counter value associated with the second clock source reaching a predetermined value and at a defined transition of the second clock source subsequently re-enabling a first frequency counter to resume counting at a new first frequency counter value based on a duration of time that the first clock source was disabled and a previous first frequency counter value of the first clock source present when the first clock source is selectively disabled.
27. The method of item 26, further comprising: storing a first frequency counter value representative of the first clock source of the system and generated by the first frequency counter when the first clock source is enabled and storing a second frequency counter value representative of the second clock source of the system during operation of the system, the storing of the first frequency counter value and the second frequency counter value occurring at one or more transitions of a transition type of the second clock source.

28. The method of item 26, where storing the first frequency counter value of the first clock source and the second frequency counter value of the second clock source at each occurrence of the transition type of the second clock source, overwriting a most recent stored first frequency counter value and a most recent stored second frequency counter value.

29. The method of item 26, where the first clock frequency is higher than the second clock frequency.

30. The method of item 26, selectively disabling operation of the first clock source between periods of activity of the system.

31. The method of item 30, where the periods of activity of the system comprise one or more of periods of data reception and periods of data transmission by the system.

32. The method of item 30, where the periods of activity of the system are one or more scheduled operations by the system.

33. The method of item 32, where the periods of activity are one or more periods of scheduled data reception and scheduled data transmission by the system.

34. The method of item 26, further comprising determining the new first frequency counter value from a last stored first frequency counter value and a first frequency counter offset value, where the last stored first frequency counter value is the previous first frequency counter value of the first clock source present when the first clock source is selectively disabled.

35. The method of item 34, determining the first frequency count offset value by multiplying a difference between the second frequency counter value at the defined transition of the second clock source and a last stored second frequency counter value by a ratio of a first frequency of the first clock source to a second frequency of the second clock source.

36. The method of item 26, further comprising performing a scheduled operation by the system based upon the new first frequency counter value of the first clock source.

37. The method of item 26, further comprising: upon start-up of the system and responsive to detecting the occurrence of the transition type of the second clock source, enabling both a first frequency counter of the first clock source and the second frequency counter of the second clock source to begin counting.

38. The method of item 26, further comprising: the system entering a low-power condition when the first clock source is disabled.

39. The method of item 26, where the system is a multiple power-domain system and further comprising: selectively disabling one or more subsystems of the system between periods of inactivity of the one or more subsystems of the system; and when re-enabling operation of the first clock source further comprising restoring power to the one or more sub-systems of the system.

40. A method, comprising: selectively disabling operation of a first clock source of a system while maintaining operation of a second clock source of the system during operation of the system, the first clock source having a first clock frequency of the first clock source and the second clock source having a second clock frequency of the second clock source; upon occurrence of a wake-up trigger based on a counter value associated with the second clock source, re-enabling operation of the first clock source; and re-enabling a first clock source counter associated with the first clock source to resume counting at a new first clock source counter value substantially the same as would have been achieved by the first clock source counter if the first clock source had not been disabled, re-enabling the first clock source counter at the new first clock source counter value subsequent to re-enabling operation of the first clock source.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system, comprising:
   a system controller;
   a timer controller coupled to and controlled by the system controller;
   a first clock source coupled to and controlled by the system controller, the first clock source having a first clock frequency;
   a first counter coupled to the first clock source, coupled to and controlled by the timer controller, and operable to count at the first clock frequency or a derivative of the first clock frequency, where the first clock source and the first counter are selectively enabled and disabled during operation of the system;
   a second clock source coupled to and controlled by the system controller, the second clock source having a second clock frequency less than the first clock frequency; and
   a second counter coupled to the second clock source, coupled to and controlled by the timer controller, and operable to count at the second clock frequency or a derivative of the second clock frequency, where the second clock source and the second counter are enabled during operation of the system,
   where, at a first time, the system controller disables operation of the first clock source and the first counter,
   where, at a second time subsequent to the first time, the system controller enables operation of the first clock source,
   where, at a third time subsequent to the second time, the system controller enables operation of the first counter to resume counting at a new first counter value,
   where the timer controller determines the new first counter value based on a duration of time between the first time and the third time, a ratio of the first clock frequency to the second clock frequency, a previous first counter value at the first time, and a division remainder value based upon a division modulo a factor of the second clock frequency and a previous resumption of the first counter.

2. The system of claim 1, where the timer controller communicates the new first counter value to the system controller.

3. The system of claim 1, where, prior to the third time, the timer controller initializes the first counter with the new first counter value.

4. The system of claim 3, where, responsive to the system controller enabling operation of the first clock source at the second time, the first clock source warms up during a warm-up period and becomes active during an active period that is subsequent to the warm-up period.

5. The system of claim 4, where the first counter is initialized with the new first counter value during one or more of the warm-up period of the first clock source and a portion of the active period of the first clock source that occurs prior to the third time.

6. The system of claim 1, where the timer controller is operable to generate the new first counter value after the second time and to then initialize the first counter with the new first counter value before the third time.

7. The system of claim 1, where the second time is defined by a second counter value of the second counter reaching a predetermined value.

8. The system of claim 1, where the timer controller is operable to generate the new first counter value by adjusting a retrieved first counter value to correct for the duration of time between the first time and the third time.

9. The system of claim 8, where the retrieved first counter value is the previous first counter value at the first time and was retrieved from a storage element of the system.

10. The system of claim 1, where the timer controller determines the duration of time between the first time and the third time based on a second counter value of the second counter at the first time, and a second counter value of the second counter at the third time.

11. The system of claim 10, where the timer controller further determines the new first counter value based on a first counter offset value.

12. The system of claim 10, where the timer controller determines the new first counter value by multiplying a difference between the second counter value at the third time and the second counter value of the second counter at the first time by the ratio of the first clock frequency to the second clock frequency, and adding the previous first counter value at the first time.

13. The system of claim 1, further comprising one or more functional blocks operable to perform one or more scheduled operations based upon the new first counter value of the first clock source and under control of the system controller.

14. The system of claim 1, where the system is a multiple power-domain system and further power savings of the system are realized by powering down one or more subsystems of the system between periods of activity of the system.

15. The system of claim 14, where the periods of activity of the system comprise one or more of periods of warm-up, warm-down, data reception, data transmission, data processing by the system, scheduled data reception by the system, and scheduled data transmission by the system.

16. A method, comprising:
at a first time, disabling operation of a first clock source and a first counter of a system while maintaining operation of a second clock source and a second counter of the system, the first clock source having a first clock frequency, the first counter operable to count at the first clock frequency or a derivative thereof, the second clock source having a second clock frequency, and the second counter operable to count at the second clock frequency or a derivative thereof;
at a second time subsequent to the first time, enabling operation of the first clock source when a second counter value reaches a predetermined value; and
upon a defined transition of the second clock source at a third time subsequent to the second time, enabling the first counter to resume counting at a new first counter value,
where the new first counter value is determined based on a duration of time between the first time and the third time, a ratio of the first clock frequency to the second clock frequency, a previous first counter value at the first time, and a division remainder value based upon a division modulo a factor of the second clock frequency and a previous resumption of the first counter.

17. The method of claim 16, further comprising:
storing a first counter value at the first time, and
storing a second counter value at the first time,
where the storing of the first counter value and the second counter value occurs at one or more transitions of a transition type of the second clock source.

18. The method of claim 17, where said storing the first counter value includes overwriting a most recent stored first counter value, and where said storing the second counter value includes overwriting a most recent stored second counter value.

19. The method of claim 16, selectively disabling operation of the first clock source between periods of activity of the system.

20. The method of claim 19, where the periods of activity of the system comprise one or more of periods of data reception, periods of data transmission by the system, and one or more scheduled operations by the system.

21. The method of claim 16, where the new first counter value is further determined from a first counter offset value.

22. The method of claim 21, where the new first counter value is determined by multiplying a difference between the second counter value at the third time and the second counter value at the first time by the ratio of the first frequency of the first clock source to the second frequency of the second clock source.

23. The method of claim 16, further comprising performing a scheduled operation by the system based upon the new first counter value.

24. The method of claim 16, where the system is a multiple power-domain system and the method further comprises:
selectively disabling one or more subsystems of the system between periods of inactivity of the one or more subsystems of the system; and
when enabling operation of the first clock source, restoring power to the one or more subsystems of the system.

25. A method, comprising:
at a first time, disabling operation of a first clock source and a first counter of a system while maintaining operation of a second clock source and a second counter of the system, the first clock source having a first clock frequency, the first counter operable to count at the first clock frequency or a derivative thereof, the second clock source having a second clock frequency, and the second counter operable to count at the second clock frequency or a derivative thereof;
upon occurrence of a wake-up trigger at a second time, enabling operation of the first clock source; and
at a third time subsequent to the second time, enabling operation of the first counter to resume counting at a new first counter value substantially the same as would have been achieved by the first counter if the first had not been disabled at the first time,
where the new first counter value is determined based on a duration of time between the first time and the third time, a ratio of the first clock frequency to the second clock frequency, a previous first counter value at the first time, and a division remainder value based upon a division modulo a factor of the second clock frequency and a previous resumption of the first counter.

* * * * *